United States Patent
Went et al.

(10) Patent No.: US 9,644,620 B2
(45) Date of Patent: May 9, 2017

(54) ACTIVE PRESSURE INTENSIFIER, REVERSE OSMOSIS SYSTEM AND USE THEREOF

(71) Applicant: Fraunhofer-Gesellschaft Zur Foerderung Der Angewandten Forschung E.V., Munich (DE)

(72) Inventors: Joachim Went, Freiburg (DE); Julian-Niclas Anhalt, Freiburg (DE)

(73) Assignee: FRAUNHOFER-GESELLSCHAFT ZUR FOERDERUNG DER ANGEWWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/344,747

(22) PCT Filed: Sep. 19, 2012

(86) PCT No.: PCT/EP2012/068393
§ 371 (c)(1),
(2) Date: Mar. 13, 2014

(87) PCT Pub. No.: WO2013/041547
PCT Pub. Date: Mar. 28, 2013

(65) Prior Publication Data
US 2014/0374356 A1    Dec. 25, 2014

(30) Foreign Application Priority Data
Sep. 21, 2011 (DE) .......... 10 2011 114 093

(51) Int. Cl.
*F04B 23/06* (2006.01)
*B01D 61/02* (2006.01)
(Continued)

(52) U.S. Cl.
CPC ............ *F04B 23/06* (2013.01); *B01D 61/025* (2013.01); *B01D 61/06* (2013.01); *B01D 61/08* (2013.01);
(Continued)

(58) Field of Classification Search
CPC ...... B01D 61/06; B01D 61/10; B01D 61/025; B01D 2311/04; B01D 2313/246; C02F 1/441; C02F 2103/08; C02F 2303/10
(Continued)

(56) References Cited

U.S. PATENT DOCUMENTS 3,188,963 A    6/1965  Tyler
4,747,266 A *  5/1988  Cadee .................... F16D 31/02
60/325

(Continued)

FOREIGN PATENT DOCUMENTS

DE     326748 A1    10/1920
DE   10036197 A1     7/2002
(Continued)

OTHER PUBLICATIONS

English translation of the International Preliminary Report on Patentability mailed Apr. 3, 2014 in connection with International Application PCT/EP2012/068393, 9 pages.

(Continued)

*Primary Examiner* — Krishnan S Menon
*Assistant Examiner* — Waqaas Ali
(74) *Attorney, Agent, or Firm* — Gesmer Updegrove LLP

(57) ABSTRACT

The invention relates to an active pressure intensifier which comprises an axial piston pump having a housing in which a drum which is driven via a drive shaft for rotation and has at least two piston chambers is disposed, the piston chambers respectively having a liquid inlet and a liquid outlet and, in the piston chambers respectively, a piston with at least one (Continued)

piston rod being disposed. Likewise, a reverse osmosis plant which has this active pressure intensifier is provided according to the invention. Likewise, a method for changing the concentration of dissolved components in liquid solutions by means of reverse osmosis is provided according to the invention. The subject according to the invention is used in particular in sea- and brackish water desalination, in waste water treatment, in the foodstuff industry, in the chemical industry and in mining.

11 Claims, 4 Drawing Sheets

(51) Int. Cl.
| | | |
|---|---|---|
| C02F 1/44 | (2006.01) | |
| B01D 61/08 | (2006.01) | |
| F04B 1/16 | (2006.01) | |
| F04B 1/14 | (2006.01) | |
| F04B 1/20 | (2006.01) | |
| B01D 61/06 | (2006.01) | |
| C02F 101/12 | (2006.01) | |
| C02F 103/08 | (2006.01) | |
| C02F 103/10 | (2006.01) | |
| C02F 103/32 | (2006.01) | |
| C02F 103/34 | (2006.01) | |

(52) U.S. Cl.
CPC .............. *C02F 1/441* (2013.01); *F04B 1/146* (2013.01); *F04B 1/16* (2013.01); *F04B 1/2014* (2013.01); *B01D 2313/243* (2013.01); *B01D 2313/246* (2013.01); *C02F 2101/12* (2013.01); *C02F 2103/08* (2013.01); *C02F 2103/10* (2013.01); *C02F 2103/32* (2013.01); *C02F 2103/34* (2013.01); *C02F 2301/066* (2013.01); *Y02W 10/37* (2015.05)

(58) Field of Classification Search
USPC ................. 210/652, 321.66; 417/53, 225
See application file for complete search history.

(56) References Cited

U.S. PATENT DOCUMENTS

| | | | |
|---|---|---|---|
| 7,799,221 B1 * | 9/2010 | MacHarg | ................. 210/321.66 |
| 7,988,428 B1 | 8/2011 | Macharg | |
| 2005/0123412 A1 * | 6/2005 | Shimizu | ........................ 417/269 |
| 2011/0062063 A1 | 3/2011 | Takahashi et al. | |

FOREIGN PATENT DOCUMENTS

| | | | | |
|---|---|---|---|---|
| DE | 69522110 T2 | 6/2006 | | |
| DE | 102007048316 A1 | 4/2009 | | |
| DE | 102008044869 A1 | 3/2010 | | |
| DE | 102008046168 A1 | 3/2010 | | |
| EP | 1519042 A1 | 3/2005 | | |
| EP | 1672215 A2 | 6/2006 | | |
| GB | 5534483 A | 5/1943 | | |
| GB | 935145 A | * | 8/1963 | ............ F16H 39/14 |
| GB | 1457215 A | * | 12/1976 | ............ F01B 3/0085 |

OTHER PUBLICATIONS

The International Search Report and the Written Opinion issued in connection with PCT Application No. PCT/EP2012/068393, mailed on Jan. 16, 2013.

* cited by examiner

ACTIVE PRESSURE INTENSIFIER, REVERSE OSMOSIS SYSTEM AND USE THEREOF

PRIORITY INFORMATION

The present invention is a 371 National Phase Application of PCT/EP2012/068393, filed on Sep. 19, 2012 that claims priority to German Application No. 102011114093.3 filed on Sep. 21, 2011, which are incorporated herein by reference in their entireties.

BACKGROUND OF THE INVENTION

The invention relates to an active pressure intensifier which comprises an axial piston pump having a housing in which a drum which is driven via a drive shaft for rotation and has at least two piston chambers is disposed, the piston chambers respectively having a liquid inlet and a liquid outlet and, in the piston chambers respectively, a piston with at least one piston rod being disposed. Likewise, a reverse osmosis plant which has this active pressure intensifier is provided according to the invention. Likewise, a method for changing the concentration of dissolved components in liquid solutions by means of reverse osmosis is provided according to the invention. The subject according to the invention is used in particular in sea- and brackish water desalination, in waste water treatment, in the foodstuff industry, in the chemical industry and in mining.

There is a large number of high-pressure applications in which energy recovery from the potential energy of a partial volume flow appears sensible. In the fields of reverse osmosis, mining and chemical processing technology, this sort of thing is partially achieved. For all these applications, it is possible to use the invention. The basic principle is explained with the example of the reverse osmosis process for sea water desalination.

In general, in the case of such plants, sea-, brackish- or salinated well water is forced as so-called feed or supply into one or more membrane modules at high pressure above the osmotic pressure. The feed volume flow is divided inside these membrane modules into two partial volume flows, consisting of permeate volume flow and concentrate volume flow.

The permeate volume flow emerges quasi-unpressurised from the membrane and, in the case of sea water desalination, represents the product of the process which can be used subsequently as fresh water. In the case of other reverse osmosis processes, in which concentration of fruit juices for example is of concern, the concentrate mass flow forms the desired product mass flow. The ratio of permeate volume flow to feed volume flow is thereby defined as output rate. In the concentrate volume flow, consisting of concentrated salt water in the case of sea water desalination, potential energy is stored on the basis of its high pressure. The use of this high pressure forms the approach for all known systems of energy recovery in reverse osmosis plants. Energy recovery can basically be effected in two ways: by conversion or direct transmission of the concentrate pressure. In the case of pressure transmission, there are possibilities of isobaric or pressure-intensifying exchange.

In the case of conversion of the concentrate pressure, the energy stored at high pressure of the concentrate can be converted, with the help of flow- or displacement machines, into mechanical energy and subsequently can be used to assist the pressure increase at the beginning of the process. In the case of displacement machines, the output rate is fixed by the stroke- and suction volumes of pump and motor. An example of this is a combination of axial piston pump and -motor. Pump and motor are connected to each other via a shaft, as a result of which a centrally disposed electric motor is relieved of load during driving of the pump. Flow machines, on the other hand, allow in fact in general a variable output rate as a function of a plant characteristic but, because of their kinematic properties, can only be used efficiently in reverse osmosis plants of a fairly large construction.

In the case of conversion of the energy stored in the concentrate pressure for mechanical relief of load of the feed pump, few improvement options result since the components are already optimised with respect to flow technology and the only approach would reside in reducing mechanical loss factors. However the potential is estimated to be low.

As an alternative to energy conversion, the concentrate pressure can also be transmitted directly to the feed volume flow. These two volume flows must not however mix notably during the pressure transmission since, otherwise, because of the increased salt concentration in the feed, the osmotic pressure thereof and ultimately the required plant pressure would rise. For this reason, a piston cylinder is used in most systems for pressure exchange, as a result of which the volumes with a different material concentration are separated spatially.

If the pressure working surfaces on both sides of the piston are identical, for example in the case of pressure exchanger pipes with rodless pistons, then this is termed isobaric pressure exchange. Here, the pressure is conveyed without hydraulic transmission from the concentrate to a part of the feed. Plants of such a construction are operated in cooperation with a high-pressure pump (HPP) and a recirculation pump (RCP). FIG. 1 shows a plant according to this plan. An HPP 1 forces feed 2 in the direction of one or more membrane modules 3 by effecting a separation of the volume flow into the permeate volume flow 4 and the concentrate volume flow 5. The concentrate 5 is subsequently conducted via a valve arrangement 6 into a first of a plurality of pressure exchanger pipes 7, 8 in which it displaces a piston 9. On the other side of this piston 9, feed 10 is received in this first pressure exchanger pipe and is discharged by displacement in the direction of the membrane module 3.

The continuous operation of the plant is ensured by a large number of pipes which are supplied intermittently with concentrate via a valve arrangement 6. Whilst a first pipe is filled with concentrate, the now quasi-unpressurised concentrate from the previous cycle must be discharged out of a second pipe and this must be filled with fresh feed for the following cycle. For this purpose, a low-pressure filling pump (LPP) 11 is required. During switch-over of the valves, the result can be at times strong pressure surges in the system since the concentrate volume flow comes to a standstill for a short time on the high-pressure side. Valve concepts which prevent this are very complex and not obtainable in small constructional sizes.

Since the concentrate loses pressure as a result of friction when passing through the process, this pressure loss must be compensated for before feeding the feed in again into the volume flow from the HPP 1 by means of an RCP 12 since otherwise no circulation would be able to be maintained. The RCP 12 represents a disproportionate cost factor because housing and sealing elements must be designed for high pressure although only a low output of the recirculation flow need be accomplished. This leads to a niche product which increases the initial costs.

By means of separate control of HPP 1 and RCP 12, the volume flows of feed and concentrate can be specifically controlled in the case of the energy recovery concept of the isobaric pressure exchange. Consequently, the great advantage of a variable output rate is presented. Particularly in the case of a varying salt content of the feed and also in the case of a varying supply of energy, this is of interest since any number of plant operation points can be controlled due to the variable output rate. Hence, an energy optimum of the desalination process can be achieved at any time. Because of the relatively complex construction of such plants, this concept has to date generally only been applied in large plants.

If the pressure working surfaces on both sides of a piston are not identical, then the result is a pressure change over the piston due to a hydraulic transmission. The piston is operated together by a pump and the concentrate pressure.

This represents the approach of so-called pressure intensification and leads to small, compact systems which are simpler with respect to the plant construction. Conveyance of the feed and also the energy recovery can be effected in a single component. Analogously to the displacement machines in energy conversion, the ratio of the volume flows of feed and concentrate, and hence the output rate, is always however fixed constructionally in the case of pressure intensifiers. In the case of constant operating conditions, this does not represent a disadvantage because the plant can be designed correspondingly for the nominal operating point. With respect to variable operating conditions, such systems can however barely be adapted.

By way of clarification, it must be said in addition that, in the case of previous intensifying pressure exchange, merely intensification of the initial pressure of a preceding pump is achieved with the aid of the concentrate pressure or a driving motor is relieved of load. As a result of the hydraulic transmission from piston ring surface to piston surface as such, the pressure transmitted from the concentrate to the feed is even on the contrary de facto reduced since the pressure working surface on the part of the feed is greater than on the part of the concentrate.

A system is known from U.S. Pat. No. 7,799,221 B1. This is based on the principle of transmission of the concentrate pressure to the feed. This is hereby achieved by a swash plate axial piston pump (alternative embodiments as inclined axes or wobble plates).

In contrast to known pumps of this construction, no finger pistons are used, but rather piston and piston rod with different cross-sections. The pump has a relatively simple construction since it consists of few moving components. Two oppositely situated axially flush end plates are connected together via a housing in which a drum (driven by an electric motor) rotates with a large number of piston chambers distributed axially over the cross-section.

On the side of the piston surfaces there is the end plate which enables the entry and exit of the feed. On the side of the piston ring surfaces there is the end plate which enables the entry and exit of the concentrate. The ends of the piston rods are provided with feet which slide over a stationary swash plate. The concentrate under high pressure is conducted to the piston ring surface of a cylinder. The feed has already been received on the side of the piston surface at this time. The electric motor which drives the pistons by means of inclination of the stationary swash plate is consequently relieved of load by the concentrate pressure.

As a function of the angle of rotation of the drum, the pistons are either driven forward, concentrate under pressure being conducted towards the piston ring surface and the received feed being discharged in the direction of the membrane module, or moved back, new feed being received and the quasi-unpressurised concentrate being ejected. Since the piston rods are not connected rigidly to the swash plate, the feed must be at slight high pressure during inflow so that the piston can be moved back and the concentrate can be ejected. Hence, a further (mentioned only indirectly in this concept) filling pump is required. Otherwise, the pistons would remain in the front position.

It is striking in this system that guidance of the volume flows is possible without valve arrangements. Above the surfaces of the end plates, radial passages which have cross-sections which are optimised with respect to flow technology are disposed. On the concentrate-side, arcuate oblong holes are inserted so that the inflow into a piston chamber is gradually released and closed, whilst, in a subsequent piston chamber, the filling with concentrate can already begin. As a result, pressure surges during operation can be avoided ideally.

A previous approach of the Fraunhofer Institute for Solar Energy Systems, for combining a compact plant construction with the possibility of a variable output rate, is known from the unexamined German application DE 10 2009 020 932 A1. However, large drive forces and irregular dimensions of the required semi-finished product raise questions about its use.

SUMMARY OF THE INVENTION

Starting herefrom, it was the object of the present invention to provide a reverse osmosis plant which consists of normal semi-finished products and, despite a compact system for energy recovery, enables a variable output rate without RCP, filling pump and pressure exchanger pipes.

This object is achieved by the active pressure intensifier having the features of claim 1, the reverse osmosis plant having the features of claim 7 and the method for concentrating dissolved components in liquid solutions by means of reverse osmosis having the features of claim 10. In claim 15, uses according to the invention are indicated. The further dependent claims reveal advantageous developments.

According to the invention, an active pressure intensifier is provided, which comprises an axial piston pump having a housing in which a drum which is driven via a drive shaft for rotation and has at least two piston chambers is disposed, the piston chambers respectively having a liquid inlet and a liquid outlet and, in the piston chambers respectively, a piston with at least one piston rod being disposed.

According to the invention, the concentrate has a larger pressure working surface than the oppositely situated feed, as a result of which the actual intensification of the concentrate pressure is produced during pressure exchange. As a result, the piston can in principle displace the feed, without additional drive power despite the lower pressure level of the concentrate relative to the feed, in the direction of at least one reverse osmosis membrane module. As a result of direct control of the speed of rotation of the active pressure intensifier, a desired output rate can be set.

The active pressure intensifier is distinguished by the piston rods being connected respectively to at least one mechanical device which enables mechanically initiated displacement of the piston in both axial directions.

The concept according to the invention is based on the implementation of the principle of active pressure intensification in the configuration of an axial piston pump.

Preferably, the axial piston pump is a swash plate pump, an inclined axis pump or a wobble plate pump.

The mechanical device is preferably a mechanical drive device, for particular preference a swash plate, the ends of the piston rods being pressed onto the swash plate via a rotor disc.

Another preferred embodiment provides that the axial piston pump is a swash plate axial double differential pump. The axial piston pump thereby has two swash plates as mechanical drive devices, each piston, on both sides respectively, having a piston rod with a different diameter, which is not fixed to the swash plates but is mounted movably on the swash plate, a rotor disc for pressing the ends of the piston rods onto the swash plates being able to be dispensed with.

The result, in addition to the actual pressure intensification of the concentrate pressure, is consequently an essential difference from the X-pump according to U.S. Pat. No. 7,799,221 B1, as to how the piston remaining in an end position is prevented. In the case of the X-pump, this takes place by means of a filling pump which allows the pistons always to return back to a starting position. In the case of an active pressure intensifier, the piston rods are connected axially via a rotor disc to the swash plate and consequently are withdrawn again and again or, in the configuration according to a swash plate axial double differential pump, constantly pressed away by respectively one of the two swash plates.

According to the invention, a reverse osmosis plant which has an active pressure intensifier as was described previously is likewise provided.

Preferably, the reverse osmosis plant has at least one reverse osmosis membrane module for separating a feed volume flow into a permeate volume flow and a concentrate volume flow and also lines for feed-, permeate- and concentrate volume flow.

The reverse osmosis plant preferably has in addition a high-pressure pump. It is hereby particularly advantageous that the reverse osmosis plant requires no recirculation pumps or low-pressure filling pumps.

According to the invention, a method for changing the concentration of dissolved components in liquid solutions by means of reverse osmosis is likewise provided, in which
a) a feed volume flow is transported via a high-pressure pump into at least one reverse osmosis membrane module in which, due to the reverse osmosis membrane, separation of the feed volume flow into a permeate volume flow with a lower concentration of the dissolved component and into a concentrate volume flow which is enriched with the dissolved components is effected,
b) the concentrate volume flow and a part of the feed volume flow is supplied to an active pressure intensifier according to one of the claims 1 to 6 and
c) the feed volume flow leaving the active pressure intensifier is supplied to the reverse osmosis membrane module.

The concentrate volume flow received in the active pressure intensifier thereby leaves the reverse osmosis plant below the plant pressure.

Preferably, the potential energy stored in the concentrate volume flow, because of the increased pressure, is used in the system for the intensifying pressure exchange and hence is partially recovered.

It is preferred furthermore that, below a specific operating point of the reverse osmosis plant, the piston is moved via the hydraulic transmission. Above a specific operating point, a motor preferably drives the drive shaft, as a result of which the ratio of permeate volume flow to feed volume flow is actively influenced.

A preferred variant of the method according to the invention provides that the concentration of dissolved components in liquid solutions is reduced. Examples of these are water treatment or sea water desalination. The permeate flow hereby then represents the product.

Another preferred variant of the method according to the invention provides that the concentration of dissolved components in liquid solutions is increased. An example of this is concentration of fruit juices. In this variant, the concentrate flow represents the product.

The use of such a plant is seen predominantly in sea- or brackish water desalination. The plant size thereby plays a subordinate role since the presented principle can be scaled in any manner and hence can be adapted to the respective requirements and conditions. These could be both mains-operated and photovoltaically operated reverse osmosis plants since the process can be adapted very flexibly to a varying supply of energy. Also manually operated desalinators are conceivable.

Further applications relate to waste water treatment, e.g. in the foodstuff industry, in the chemical industry and in mining.

DETAILED DESCRIPTION OF THE ILLUSTRATED EMBODIMENTS

The subject according to the invention is intended to be explained in more detail with reference to the subsequent Figures without wishing to restrict said subject to the special embodiments shown here.

Figure 1:
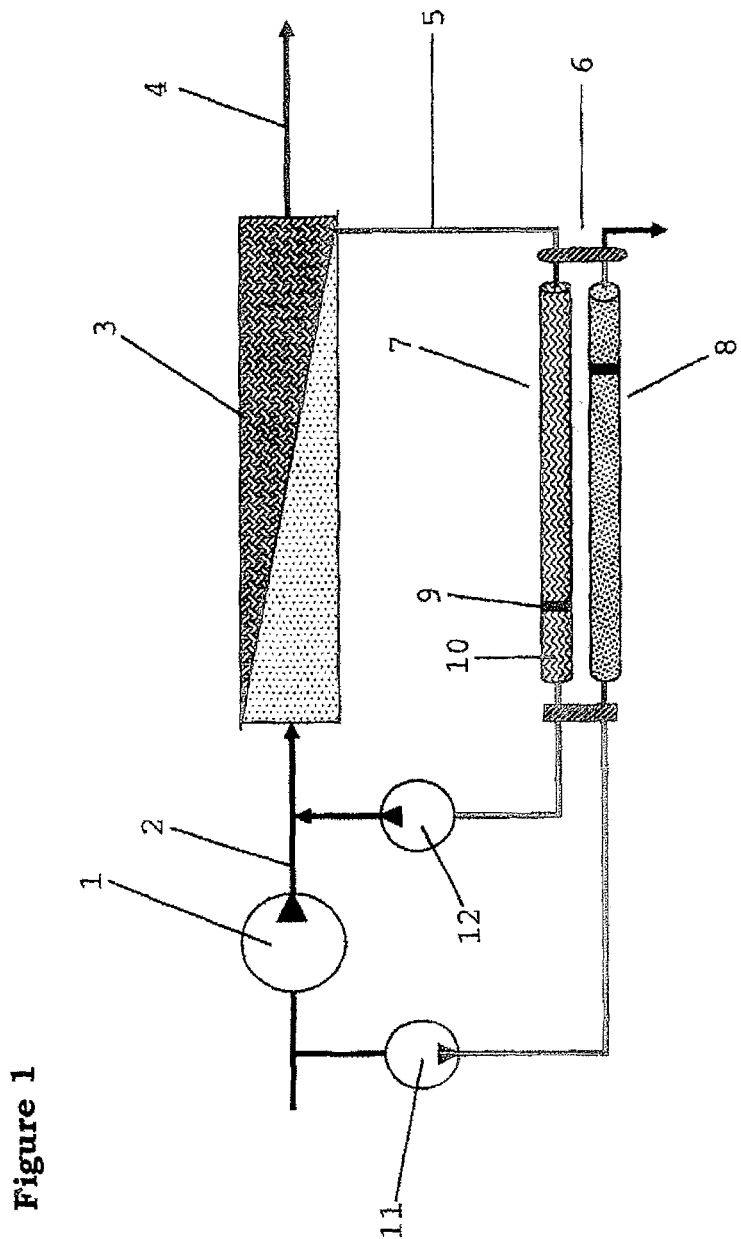
FIG. 1 shows, with reference to a schematic illustration, the method course in a reverse osmosis plant based on an isobaric pressure exchange.
Figure 2:
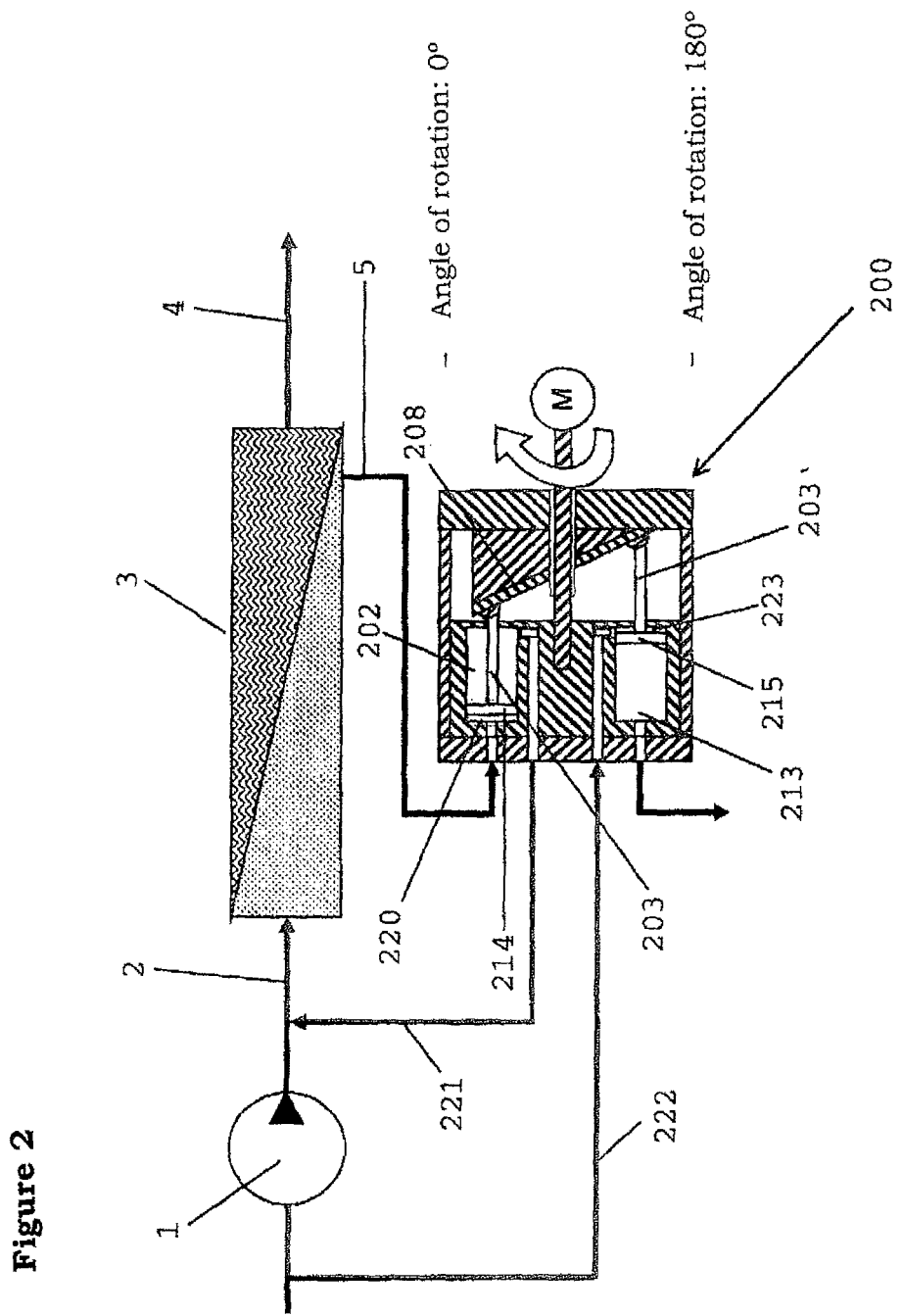
FIG. 2 shows the connection diagram of a reverse osmosis plant according to the invention having an active pressure intensifier according to the invention, configured as a swash plate axial piston pump.

The system according to the invention in FIG. 2 is based on the implementation of the principle of active pressure intensification in the constructional form of an axial piston pump 200. The concentrate 5 enters into the piston chamber 220 whilst feed is ejected from the piston ring chamber 202. By adapting the diameters of the piston rods 203, 203', the hydraulic transmission can be adjusted via the piston 214, 215 basically to the pressure losses of any plant at any preferred operating point (nominal operating point).

As can be detected, the concentrate 5 is conducted into the uppermost of a plurality of piston chambers 220 (angle of rotation 0° to 180°) whilst the piston 214 and the piston rod 203 begin to move backwards. A recirculation flow 221 is thereby displaced in the direction of at least one reverse osmosis membrane 3 out of the piston ring chamber 202. The lower piston chamber 213 has received concentrate 5 already during the previous rotation (angle of rotation 0° to 180°) and ejects this during the following rotation (angle of rotation 180° to 0°) as a result of which new quasi-unpressurised feed 222 is suctioned into the piston ring chamber 223 by the piston 215 being pressed away from the swash plate 208. The output rate can be influenced at any time simply by controlling the speeds of rotation of HPP and rotating pressure intensifier. Since the rotating pressure intensifier concerns a displacement machine, the concentrate volume flow (and hence also the output rate) can be influenced more specifically than by a flow machine as RCP.

Below the nominal operating point, the hydraulic transmission via the piston is adequate to move the latter due to the pressure force of the concentrate and hence to displace feed at high pressure in the direction of at least one membrane. Ejection of unpressurised concentrate and also refilling with feed is effected solely via the swash plate since the piston is moved forwards during rotation of the latter.

With increasing volume flows and pressure losses at higher operating points, an additional drive of the active pressure intensifier is required since the piston must now contribute additionally (in addition to the hydraulic transmission) by an active movement to the pressure increase in the piston ring chamber.

The problems of pressure surges during switch-over do not apply due to the inlets and outlets on one or both end plates being optimised with respect to flow technology since at least one piston chamber can always be supplied continuously with concentrate, whilst feed is likewise displaced continuously in the direction of the membrane modules. Both an axial piston pump in the configuration of a swash plate-, an inclined axis- and a wobble plate machine are possible.

Figure 3:
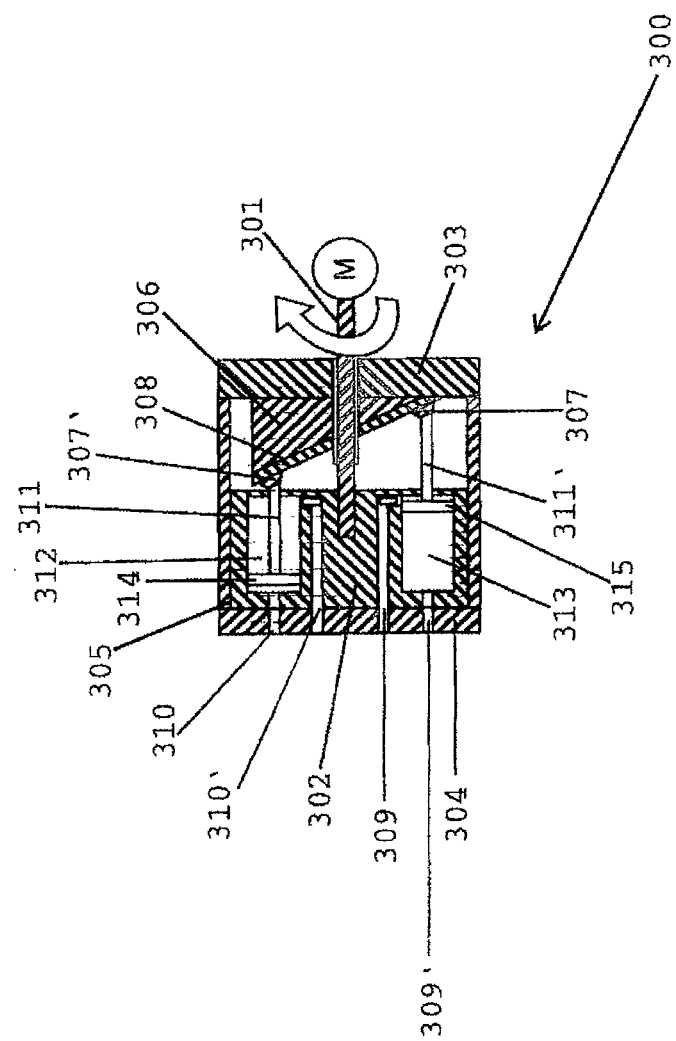
FIG. 3 shows the construction of an active pressure intensifier according to the invention, configured as a swash plate axial piston pump.

In FIG. 3, the configuration of a swash plate machine 300 is represented. The drive shaft 301 is rotated by a motor at the desired speed of rotation. The drive shaft 301 is connected rigidly to the drum 302. Consequently, the conveying power of the rotating pressure intensifier can be regulated. The drum 302 surrounds the stationary positions of the rear end plate 303, of the front end plate 304 and also of the housing 305. The swash plate 306 is connected rigidly to the rear end plate 303 and consequently does not rotate with the drum 302. The articulated feet 307, 307' connect the piston rods 311, 311' to the rotor disc 308. The rotor disc 308 can rotate on the swash plate 306 about its inclined longitudinal axis as a function of the speed of rotation of the drum 302 but cannot lift away axially from the swash plate 306 or slide radially on the latter. However, as an alternative hereto, the rotor disc 308 can also be connected rigidly to the swash plate 306 and prevent the articulated feet 307, 307' which slide on or below it from lifting away from the swash plate by means of a mechanical guide.

The inlets and outlets for feed volume flow 309, 310' and concentrate volume flow 310, 309' can pass through the drum 302, the front end plate 304, the rear end plate 303 and also the housing 305 in any combination. Feed may be ejected from the piston ring chamber 312. By adapting the diameters of the piston rods 311, 311", the hydraulic transmission can be adjusted via the piston 314, 315.

Figure 4:
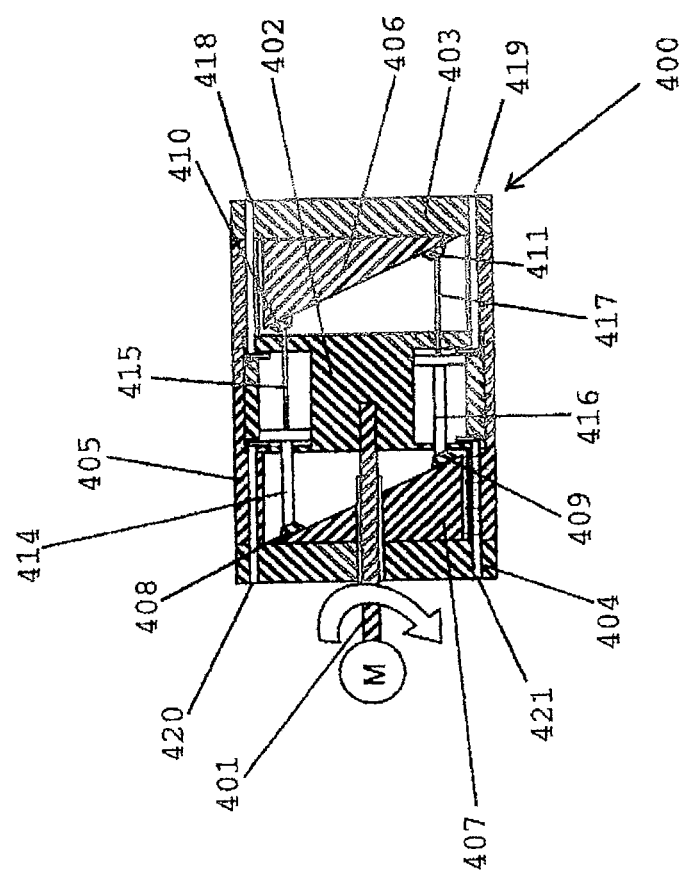
FIG. 4 shows the construction of a further active pressure intensifier according to the invention, configured as a swash plate axial double differential piston pump.

In FIG. 4, the configuration of a swash plate axial double differential piston pump 400 is illustrated. The drive shaft 401 is rotated by the motor at the desired speed of rotation. The drive shaft 401 is connected rigidly to the drum 402, as a result of which the conveying power of the rotating pressure intensifier can be regulated The drum 402 surrounds the stationary positions of the rear end plate 403, of the front end plate 404 and also of the housing 405. The swash plate 406 is connected rigidly to the rear end plate 403 and the swash plate 407 is connected rigidly to the front end plate 404. Consequently, both swash plates do not rotate with the drum 402. The piston rods 414, 416 have a larger diameter than the piston rods 415, 417. The piston rods 414, 416 are mounted via the articulated feet 408, 409 on the swash plate 407 and the piston rods 415, 417 via the articulated feet 410, 411 on the swash plate 406. In this embodiment according to the invention, the rotor disc required in the in the previous design according to FIG. 2 and FIG. 3 can be dispensed with since the piston rods and pistons even without this are always moved by one of the two swash plates 406, 407 inside the drum 402 and cannot lose contact with the drive mechanism in an end position.

Even in this embodiment, the outlets and inlets for feed 421, 420 and concentrate 419, 418 can run through the drum 402, the front end plate 404, the rear end plate 403 and also the housing 405 in any combination.

What is claimed is:

1. A reverse osmosis plant comprising an active pressure intensifier comprising
    double differential axial piston pump, with the configuration of a swash plate pump or a wobble plate pump, having a housing in which a drum is disposed wherein the drum is driven via a drive shaft for rotation and has at least two piston chambers, the piston chambers respectively having inlets and outlets for a feed volume flow and also inlets and outlets for a concentrate volume flow and, in each of the at least two piston chambers, a piston unit having a first and a second exterior side is disposed, wherein the second exterior side is opposite to the first exterior side,
    characterized in that each piston unit, has a first piston rod on its first exterior side and a second piston rod on its second exterior side, wherein the first and second piston rod have different diameters and are mounted movably on a swash plate or wobble plate, which enables a mechanically initiated displacement of the piston unit in both axial directions, and wherein the diameter of each piston unit is greater than the diameter of its first piston rod and the diameter of its second piston rod.

2. The reverse osmosis plant according to claim 1, wherein the ends of the piston rods are connected to the swash plate or wobble plate via a rotor disc, wherein the rotor disc can be dispensed with.

3. The reverse osmosis plant according to claim 1, wherein the swash plate or wobble plate is fixed on an end plate.

4. The reverse osmosis plant according to claim 1, wherein the reverse osmosis plant has at least one reverse osmosis membrane module for separating a feed volume flow into a permeate volume flow and a concentrate volume flow and also lines for feed-, permeate- and concentrate volume flow.

5. The reverse osmosis plant according to claim 1, wherein the reverse osmosis plant has at least one high-pressure pump, the reverse osmosis plant requiring no recirculation pumps or low-pressure filling pumps.

6. A method for changing the concentration of dissolved components in liquid solutions by means of reverse osmosis, in which
    a) a feed volume flow is transported via a high-pressure pump into at least one reverse osmosis membrane module in which, due to the reverse osmosis membrane, separation of the feed volume flow into a permeate volume flow with a lower concentration of the dissolved component and into a concentrate volume flow which is enriched with the dissolved components is effected,
    b) the concentrate volume flow and a part of the feed volume flow is supplied to an active pressure intensifier according to claim 1 and wherein the active pressure intensifier comprises a double differential axial piston pump, with the configuration of a swash plate pump or a wobble plate pump, having a housing in which a drum is disposed, wherein the drum is driven via a drive shaft for rotation and has at least two piston chambers, the piston chambers respectively having inlets and outlets for a feed volume flow and also inlets and outlets for a concentrate volume flow and in each of the at least two piston chambers, a piston unit having a first and a second exterior side is disposed, wherein the second exterior side is opposite to the first exterior side, characterized in that each piston unit, has a first piston rod on its first exterior side and a second piston rod on its second exterior side, wherein the first and second piston rod have different diameters, and are mounted movably on a swash plate or wobble plate, which enables a mechanically initiated displacement of the piston unit in both axial directions, and wherein the diameter of each piston unit is greater than the diameter of its first piston rod and the diameter of its second piston rod, and c) the feed volume flow leaving the active pressure intensifier is supplied to the reverse osmosis membrane module together with the feed volume flow of a high-pressure pump, the concentrate volume flow received in the active pressure intensifier leaving the reverse osmosis plant below the plant pressure.

7. The method according to claim 6,
characterized in that the potential energy stored in the concentrate volume flow, because of the increased pressure, measured at normal pressure, is used in the system for the intensifying pressure exchange and hence is partially recovered.

8. The method according to claim 6,
wherein, below a specific operating point of the reverse osmosis plant, the piston is moved by means of a hydraulic transmission.

9. The method according to claim 6,
wherein, above a specific operating point, a motor drives the drive shaft, as a result of which the ratio of permeate volume flow to feed volume flow is actively influenced.

10. The method according to claim 6,
wherein the concentration of dissolved components in liquid solutions is reduced, in particular for water treatment or sea water desalination or the concentration of dissolved components in liquid solutions is increased, in particular for concentrating fruit juices.

11. Method for sea- and brackish water desalination, or waste water treatment, wherein the reverse osmosis plant according to claim 1 is used.

* * * * *